US008576505B2

(12) United States Patent  (10) Patent No.: US 8,576,505 B2
Evans et al.  (45) Date of Patent: Nov. 5, 2013

(54) TAPE DRIVE APPARATUS AND METHOD (75) Inventors: Nigel Ronald Evans, Bristol (GB);
Andrew Malcolm George Clarke,
Bristol (GB); John Mark Mackelden,
Chippenham (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1634 days.

(21) Appl. No.: 11/260,994

(22) Filed: Oct. 28, 2005

(65) Prior Publication Data

US 2007/0097534 A1  May 3, 2007

(51) Int. Cl.
G11B 5/09  (2006.01)
(52) U.S. Cl.
USPC .............. 360/48; 360/31; 360/53; 360/77.12; 360/78.02
(58) Field of Classification Search
None
See application file for complete search history.

(56) References Cited

U.S. PATENT DOCUMENTS

| | | | | |
|---|---|---|---|---|
| 5,081,548 A * | 1/1992 | Inazawa et al. | ............... | 360/72.2 |
| 5,182,675 A * | 1/1993 | Arbisi et al. | ................... | 359/841 |
| 5,182,678 A * | 1/1993 | Hatanaka et al. | ............... | 360/32 |
| 5,249,231 A * | 9/1993 | Covey et al. | ................... | 711/163 |
| 5,287,478 A * | 2/1994 | Johnston et al. | ............... | 711/111 |
| 5,367,410 A * | 11/1994 | McCarthy | ....................... | 360/48 |
| 5,485,321 A * | 1/1996 | Leonhardt et al. | ............... | 360/48 |
| 5,493,455 A * | 2/1996 | Miyoshi et al. | .................. | 360/60 |
| 5,576,903 A * | 11/1996 | Brown et al. | .................... | 360/48 |
| 5,602,686 A * | 2/1997 | Shih | ................ | 360/48 |
| 5,617,265 A * | 4/1997 | Horihata | ......................... | 360/69 |
| 5,862,008 A * | 1/1999 | Yamada et al. | ................. | 360/69 |
| 5,892,633 A * | 4/1999 | Ayres et al. | ................ | 360/73.08 |
| 5,923,810 A * | 7/1999 | Nishikata | ........................ | 386/56 |
| 6,025,967 A * | 2/2000 | Kuta et al. | ...................... | 360/69 |
| 6,058,494 A * | 5/2000 | Gold et al. | ....................... | 714/42 |
| 6,084,736 A * | 7/2000 | Kurokawa et al. | .............. | 360/71 |
| 6,216,057 B1 * | 4/2001 | Jesionowski | .................. | 700/214 |
| 6,433,951 B1 | 8/2002 | Lubratt | | |
| 6,493,166 B1 * | 12/2002 | Takayama | ....................... | 360/69 |
| 6,611,394 B1 * | 8/2003 | Kato et al. | ...................... | 360/69 |
| 6,624,961 B1 * | 9/2003 | Takayama | .................... | 360/72.3 |
| 6,667,846 B2 * | 12/2003 | Kano et al. | ................. | 360/96.51 |
| 6,762,898 B2 | 7/2004 | Azuma | | |
| 6,918,554 B2 | 7/2005 | Stamm et al. | | |
| 7,262,778 B1 * | 8/2007 | Edwards et al. | ............... | 345/589 |
| 7,480,113 B2 * | 1/2009 | Evans | .............................. | 360/69 |
| 7,805,563 B2 * | 9/2010 | Topham | ......................... | 711/111 |
| 2002/0151992 A1 * | 10/2002 | Hoffberg et al. | ................. | 700/83 |
| 2002/0167753 A1 * | 11/2002 | Basham et al. | ............. | 360/77.12 |
| 2003/0126460 A1 * | 7/2003 | Camble et al. | ................. | 713/200 |
| 2004/0012876 A1 * | 1/2004 | Tahara | ............................. | 360/69 |
| 2004/0190179 A1 * | 9/2004 | Kato et al. | ...................... | 360/69 |
| 2005/0018342 A1 | 1/2005 | Kato et al. | | |
| 2006/0023357 A1 * | 2/2006 | Deckers et al. | ............... | 360/134 |
| 2006/0082916 A1 | 4/2006 | Evans et al. | | |

* cited by examiner

*Primary Examiner* — Dismery Mercedes (57) ABSTRACT

Disclosed is a method of storing data on a tape medium in at least one data recording session employing a tape drive apparatus operable to record the data in accordance with a format specifying an unused area of the tape medium. The method comprises formatting the tape medium according to the format, and recording a tape medium identifier in the specified unused area of the tape medium.

16 Claims, 5 Drawing Sheets

TAPE DRIVE APPARATUS AND METHOD

BACKGROUND AND RELATED ART

For several decades, magnetic tape media and corresponding data storage devices known as tape drives have been used for storing digital data in non-volatile form, most commonly with the application of providing secondary or backup storage and retrieval. Initially the magnetic tapes were wound about large reels in similar manner as film for film projectors. In more recent years the magnetic tape has typically been housed in a cartridge or cassette, extending internally in the cartridge from a supply reel to a take-up reel. To allow interoperability between different tape media and tape drives, including those of different vendors, the mechanical dimensions and magnetic properties of the tape media, as well as the exact method according to which data is to be recorded on the tape media are typically governed by agreed industry standards.

With corporations shifting from single tape drives attached to single host computers to deploying large numbers of tape drives organised in tape libraries, the ability to use tape media interchangeably with a large number of tape drives has grown in importance. Adherence of tape media and tape drives used in a corporation to a common format, or to a set of compatible formats is therefore of great value. In another consequence, in order to early diagnose technical problems with a particular tape medium or tape drive it becomes increasingly important to be able to uniquely identify and track the tape usage history of each tape medium.

One known format of magnetic tape media for providing storage and retrieval of digital data is the Digital Data Storage (DDS) format, which has evolved from Digital Audio Tape (DAT) technology and developed through a number of versions. Each new version provided improvements over the preceding version, among those being one or more of enlarged capacity of the tape medium, higher speed of data recording and retrieval, improved reliability, and additional functionality for tape medium management.

The $6^{th}$ version of the DDS format, which is known as DAT 160, provides the capability of the tape drive to uniquely identify a tape medium by recording a unique cartridge serial number on the tape medium. A further improvement introduced by the DAT 160 version is the capability to store an extended log of tape usage information on the tape medium, the extended log including twelve log sections in which tape usage information is recorded relating respectively to the last twelve data recording sessions. Tape usage information recorded in each log section includes usage and error statistics as well as an identification of the tape drive on which the tape medium was loaded during the respective session. Tape media complying with the DAT 160 version of the DDS format cannot be read or written to using tape drives produced according to an earlier version of the DDS format.

Among the versions of the DDS format in widespread use are the $3^{rd}$, $4^{th}$, and $5^{th}$ version, known respectively as DDS-3, DDS-4, and DAT-72. These versions do not provide within their respective format specifications for the storage of a tape medium identifier that would allow uniquely identifying a tape medium.

The TapeWare backup application embeds a tape medium identifier within user data written to a tape medium. This identifier is lost when a different application is used to overwrite the user data on the tape medium.

SUMMARY OF THE INVENTION

According to the present invention, there is now provided a method of storing data on a tape medium in at least one data recording session employing a tape drive apparatus operable to record the data in accordance with a format that specifies an unused area of the tape medium. The method comprises formatting the tape medium according to the format, and recording a tape medium identifier in the specified unused area of the tape medium.

The invention is advantageous because it enables to uniquely identify the tape medium in a backward compatible way. Because the format according to which the tape medium is formatted specifies an unused area, the tape medium on which the tape medium identifier is recorded during a data recording session in the tape drive apparatus can be loaded for further data recording sessions not only on the tape drive apparatus itself but also on a legacy tape drive apparatus that is compliant with the format and does not alter the unused area. Recording sessions employing the legacy tape drive apparatus do not affect the unused area of the tape medium, where the tape medium identifier is stored. Therefore, the tape medium identifier will not be overwritten, erased, or altered during recording sessions employing the legacy tape drive apparatus. When after one or more recording sessions employing the legacy tape drive apparatus the tape medium is again loaded on the tape drive apparatus, the unchanged tape medium identifier allows the tape drive apparatus to uniquely identify the tape medium.

For example, when the legacy tape drive apparatus is one of an installed base of legacy tape drive apparatuses used by an enterprise, the legacy tape drive apparatuses being operable to record data on tape media according to a common format, the enterprise can use the same type of tape media interchangeably in all of the legacy tape drive apparatuses. The present invention enables the enterprise to supplement the installed base of legacy tape drive apparatuses with enhanced tape drive apparatuses that are capable of uniquely identifying tape media, and use the same type of tape media interchangeably in both the legacy tape drive apparatuses and the enhanced tape drive apparatuses. In this way the enterprise benefits from the continued interchangeability of the tape media among the tape drive apparatuses without the high cost of replacing all legacy tape apparatuses with enhanced tape drive apparatuses.

In accordance with an embodiment, the method further comprises determining whether the unused area of the tape medium comprises a previously recorded tape medium identifier, and reading the previously recorded tape medium identifier from the unused area for re-use of the same tape medium identifier for the recording of the tape medium identifier. This embodiment is particularly advantageous because it enables the tape medium to remain uniquely identifiable even after being subjected to re-formatting in the tape drive apparatus.

In accordance with an embodiment, the method further comprises determining whether the tape medium has previously been formatted. The recording of the tape medium identifier is then performed only when the unused area of the tape medium comprises a previously recorded tape identifier or the tape medium has not previously been formatted. The recording of the tape medium identifier is not performed for tape media that have initially been formatted in the legacy tape drive apparatus, which does not record a tape drive identifier in the unused area according to the present invention, or that have been re-formatted in another tape drive apparatus compatible with the format that erases the tape medium identifier from the unused area during formatting. This embodiment is particularly advantageous because it enables to track the entire history of past use of a tape medium using the tape medium identifier, by relying on the tape medium having been identifiable by the same tape medium identifier throughout its entire history of past use.

In accordance with an embodiment, the format further specifies the tape medium to comprise mandatory content in a specified location on the tape medium, for example tape management information or separator marks that separate different areas of the formatted tape medium. The determining whether the tape medium has previously been formatted comprises reading data from the specified location of the tape medium, detecting from the data whether the tape medium comprises the mandatory content in the specified location, and determining that the tape medium has previously been formatted when the tape medium comprises the mandatory content in the specified location.

In accordance with an embodiment, the determining whether the tape medium has previously been formatted further comprises writing first test data to a test location of the tape medium, and reading second test data from the test location of the tape medium. Comparing the second test data with the first test data, an error rate is calculated based on the comparison. The tape medium is determined to not have previously been formatted when the tape medium does not comprise the mandatory content in the specified location and the error rate does not exceed a predefined threshold. This embodiment is particularly advantageous because it enables to prevent erroneously finding the tape medium to be unformatted when clogged tape heads or other causes interfere with reading any data from the tape medium.

In accordance with an embodiment, the format further specifies a count of data recording sessions in a tape drive apparatus to be stored in a system area of the tape medium. The method further comprises reading the count of recording sessions from the system area of the tape medium, updating the count of recording sessions, and recording an extended log of tape usage information in the unused area of the tape medium, the extended log comprising the updated count of recording sessions. Being recorded in the unused area, the extended log is not altered during recording sessions in the legacy tape drive apparatus and thus in this case will not reflect the last recording session of the tape medium. In contrast, the legacy tape drive apparatus as every tape drive apparatus that is in compliance with the specifications of the format does update the count of recording sessions in the system area.

This embodiment is particularly advantageous because it enables to store on the tape medium tape usage information that relates to the present recording session and is not limited by the specifications of the format. Because the extended log comprises a count of recording sessions reflecting the recording session during which the extended log was recorded, the embodiment enables to compare the count of recording sessions from the extended log to the count of recording sessions from the system area to determine whether the extended log refers to the last recording session.

According to an embodiment, the extended log comprises a plurality of log sections in which tape usage information is recorded relating respectively to corresponding ones of the at least one data recording sessions, the log sections together constituting a cumulative record of tape usage, each log section in respect of a recording session comprising the count of recording sessions. This embodiment is particularly advantageous because it enables to provide a cumulative record of tape usage on a tape medium formatted according to a format that does not specify such a cumulative record.

In another aspect the present invention relates to a backward compatible storage apparatus for storing data on a sequential storage medium. The apparatus comprises means for transferring data between the sequential storage medium and the backward compatible storage apparatus in at least one data recording session, and means for formatting the sequential storage medium according to a legacy format. The legacy format specifies an unused area of the sequential storage medium that is unaffected by data recording sessions employing the legacy storage apparatus. The backward compatible storage apparatus further comprises means for recording an identifier of the sequential storage medium in the unused area of the sequential storage medium.

BRIEF DESCRIPTION OF THE DRAWINGS

In the following embodiments of the invention will be described in greater detail by way of example only making reference to the drawings in which.

DETAILED DESCRIPTION

Figure 1:
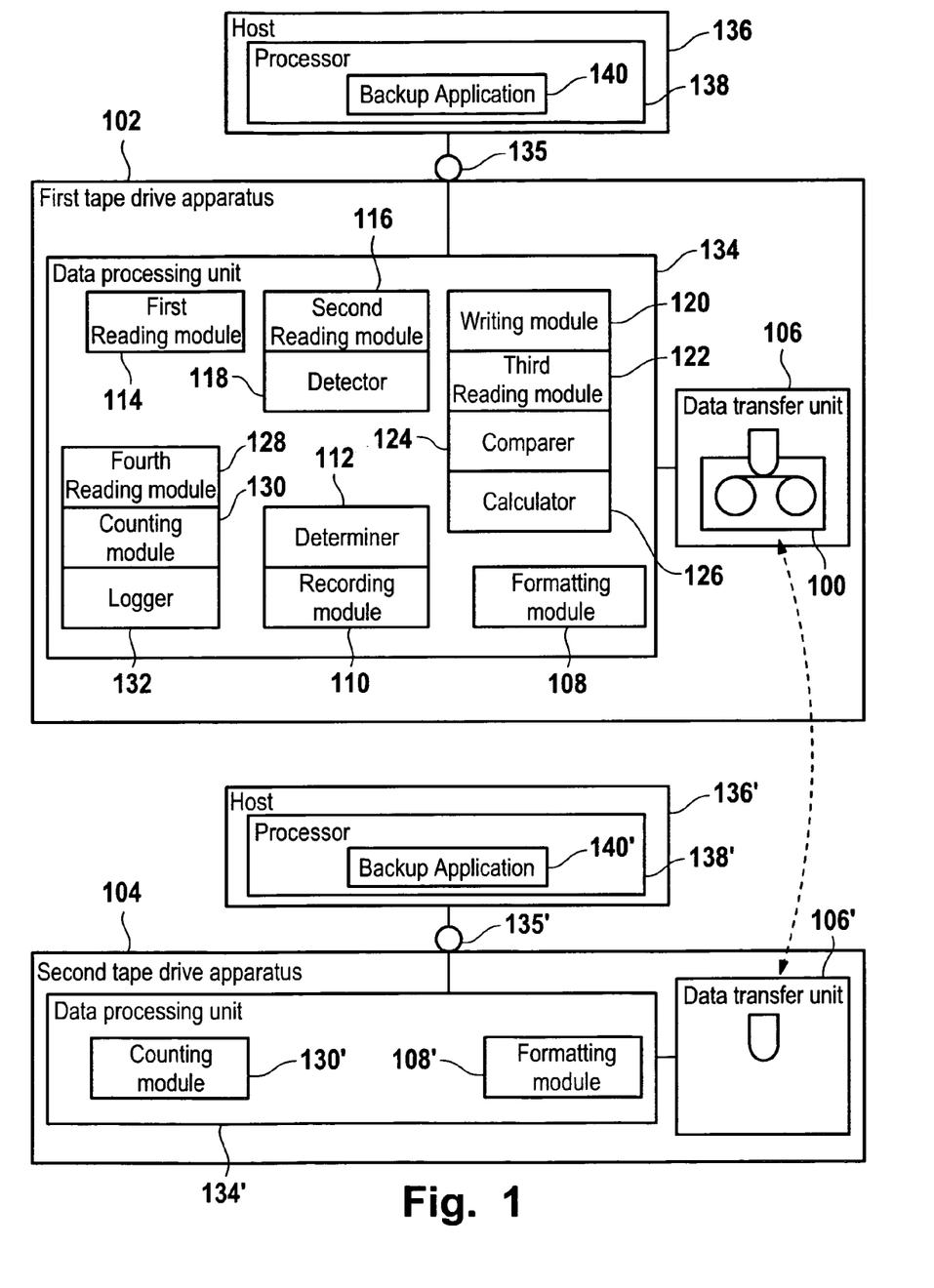
FIG. 1 is a block diagram of a tape drive apparatus of an embodiment, and a legacy tape drive apparatus to which it is backward compatible.

Referring to FIG. 1, there is shown a first tape drive apparatus 102 embodying the present invention, and a second tape drive apparatus 104 to which the first tape drive apparatus 102 is backward compatible. The first tape drive apparatus 102 comprises a data transfer unit 106, adapted to load a tape medium 100 and capable of transferring data between the loaded tape medium 100 and the first tape drive apparatus 102. The second tape drive apparatus 104 analogously comprises a data transfer unit 106' adapted to load the same tape medium 104 and capable of transferring data between the tape medium 104 and the second tape drive apparatus.

The first 102 and second 104 tape drive apparatuses comprise respective data processing units 134, 134' for controlling the reading and writing of data on the tape medium 100. The data processing unit 134 of the first tape drive apparatus 102 is connected via an interface 135 to a host computer 136 comprising a processor 138 capable of executing a backup application 140 for sending commands and data to be stored on the tape medium 100 to the data processing unit 134. Analogously, the data processing unit 134' of the second tape drive apparatus 104 is connected via an interface 135' to a host 136' comprising a processor 138' capable of executing a backup application 140' for sending commands and data to be stored on the tape medium 100 to the data processing unit 134' when the tape medium 100 is loaded on the second tape drive apparatus.

The data processing unit 134 of the first tape drive apparatus comprises a formatting module 108 operable to control the data transfer unit 106 to format the tape medium according to a format that is compatible with an analogous formatting module 108' of the second tape drive apparatus 104. In operation, after having been formatted either in the first tape drive apparatus 102 under the control of formatting module 108, or in the second tape drive apparatus 104 under the control of formatting module 108', tape medium 100 can be loaded interchangeably on either the first 102 or the second 104 tape drive apparatus for data recording sessions, in which data stored in preceding recording sessions is overwritten or appended to.

In data recording sessions employing the second tape drive apparatus 104, an unused area of the tape medium that is specified by the format is excluded from being written to and therefore remains unaffected. Optionally, the unused area also remains unaffected when the tape medium 100 is formatted in the second tape drive apparatus 104 under the control of formatting module 108'.

The data processing unit 134 of the first tape drive apparatus 102 comprises a recording module 110 for recording a tape medium identifier in the unused area of the tape medium 100. Optionally, the recording module 110 is controlled by a determiner 112 operable to determine whether the tape medium has previously been formatted, and whether a previously recorded tape medium identifier is present in the unused area of the tape medium 100. The determiner 112 relies on a first reading module 114 for controlling the data transfer unit 106 to read a previously recorded tape medium identifier from the unused area of the tape medium 100. A second reading module 116 and a detector 118 enable the determiner to determine whether the tape medium 100 has previously been formatted. A writing module 120, a third reading module 122, a comparer 124, and a calculator 126 in conjunction enable the determiner 112 to verify a finding that the tape medium 100 is unformatted by performing an error rate test for testing the reliable operation of the data transfer unit 106.

Optionally, the data processing unit 134 of the first tape drive apparatus comprises a fourth reading module 128 for reading from the tape medium 100 a count of the data recording sessions that the tape medium 100 has so far been subjected to, the count of data recording sessions being recorded in the system area of the tape medium 100 in accordance with the specifications of the format. Both the first 102 and the second 104 tape drive apparatuses comprise respective counting modules 130, 130' for updating the count of data recording sessions during a data recording session. The data processing unit 134 of the first tape drive apparatus optionally comprises a logger 132 for controlling the data transfer unit 106 to record an extended log of tape usage information in the unused area of the tape medium 100.

Figure 2:
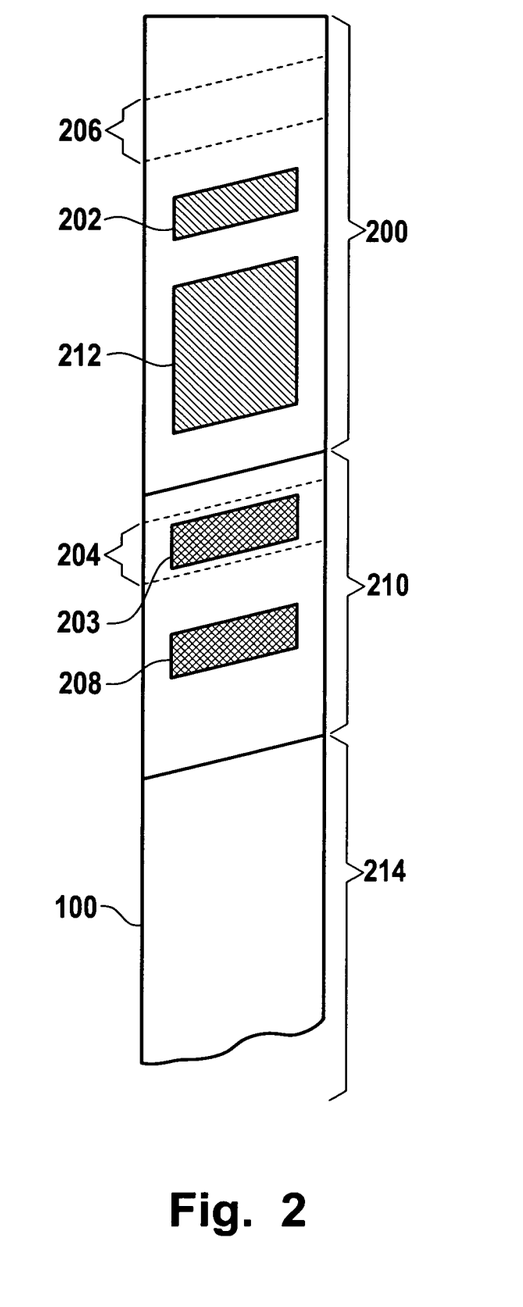
FIG. 2 is a schematic depiction of a layout of a tape medium, on which data have been stored according to a method embodying the invention.

FIG. 2 schematically depicts a layout of the tape medium 100 on which data have been stored according to a method embodying the invention. To enable the tape medium 100 to be used for recording data in recording sessions employing the second tape drive apparatus, the layout follows the format specifications. As specified by the format, the layout is divided into adjacent areas 200, 210, 214, comprising a data area 214 for recording user data, a system area 210 for recording information for managing the tape medium, in particular a count of data recording sessions 208, and an unused area 200. The use of the unused area 200 is not specified by the format. The unused area 200 remains unaffected by recording sessions in the second tape drive apparatus, and optionally also by using the second tape drive apparatus to format the tape medium 100.

While both first and second tape drive apparatuses record data in the data 214 and system 210 areas in accordance with the specifications of the format, the first tape drive apparatus additionally uses the unused area 200 to record a tape medium identifier 202 and an extended log 212 of tape usage information. Optionally, a test location 206 for writing and reading test data as part of an error rate test is also located in the unused area. In this way it is assured that user data from the user area and information for managing the tape medium from the system area remain unaffected by an error rate test performed in the test location. Optionally, the test location 206 furthermore does not overlap with locations in which the first tape drive apparatus records the tape medium identifier 202 and the extended log 212.

When tape medium 100 is formatted in either the first or second tape drive apparatus, mandatory content 203 specified by the format is written to a specified location 204 of the tape medium, optionally located within the system area 210. Optionally, the format specifies the location 204 involving a range of distances measured from the beginning of the tape medium 100, between which the mandatory content is specified to start. Optionally, the format further specifies the mandatory content 204, for example by specifying frame numbers of data frames constituting the mandatory content, in such a way that compliance of the mandatory content with the format specifications is verifiable. In this way, the presence of the mandatory data 204 in the specified location and its compliance with the format specification provides a criterion enabling the first tape drive apparatus to determine whether the tape medium 100 has previously been formatted.

In accordance with the format specifications, the layout of tape medium 100 can comprise further areas such as an end-of-data area following the end of the data area 214, or additional position tolerance bands interspersed between areas. The tape medium 100 can furthermore be formatted as a partitioned tape, in which data can be recorded in one partition independently of data recorded in another partition of the tape medium 100, each partition comprising a separate data area corresponding to data area 214.

Figure 3:
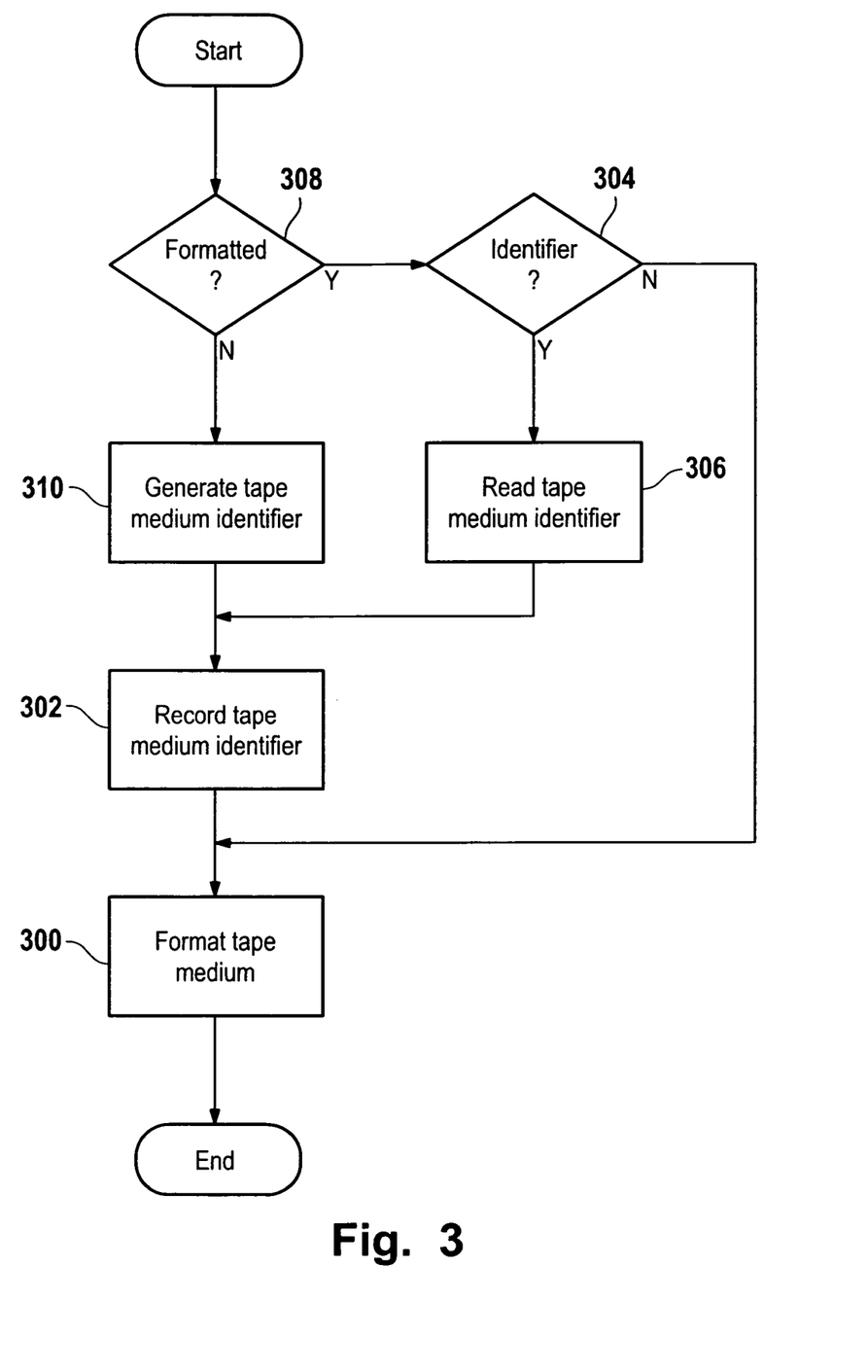
FIG. 3 is a flowchart of a method embodying the invention.

FIG. 3 shows a flowchart of a method of an embodiment of the invention. In decision step 308 the tape medium is examined to determine whether the medium is blank or has been previously formatted. If the tape medium is found to not have been formatted before, a new tape medium identifier is generated in step 310 to be assigned to the tape medium. Optionally, the tape medium identifier is generated in such a way that it is unique to the tape medium, avoiding assigning the same identifier to two or more tape media. One way of achieving the tape medium identifier to be unique involves using a counter that changes its counter value each time the tape drive apparatus performs a formatting operation, and combining the counter value with a tape drive identifier that uniquely identifies the tape drive apparatus. In step 302, the first tape drive apparatus records the tape drive identifier in the unused area of the tape medium, followed in step 300 by formatting the tape medium according to the format, preserving the tape medium identifier recorded in the unused area.

If in decision step 308 it is found that the tape medium has been previously formatted, in a further decision step 304 it is determined whether the unused area of the tape medium comprises a tape medium identifier. Optionally the unused area of the tape medium is unaffected by both formatting and data recording sessions in the second tape drive apparatus, so that the unused area will be found to not comprise any data, and a in particular comprise no tape medium identifier if the tape medium has been used for formatting and data recording sessions in the second tape drive apparatus only. However, since the format does not specify the use of the unused area, the tape medium can comprise arbitrary data frames recorded in the unused area, for example stemming from recording sessions in a further tape drive apparatus that is compliant with the format and uses the unused area for proprietary purposes. Optionally the likelihood of misinterpreting an arbitrary data frame recorded in the unused area as the tape medium identifier is significantly reduced by adding a verifiable redundancy check to the tape medium identifier.

If in decision step 304 it is found that the unused area of the tape medium comprises a tape medium identifier, in step 306 the tape medium identifier is read from the unused area. Optionally, step 306 is integrated with decision step 304, in such a way that a function is called to read the tape medium identifier from the unused area, where the function either returns an indication of success together with the tape medium identifier, or an indication that the function failed to read a tape medium identifier. In step 302, the tape medium identifier is then re-recorded in the unused area, followed by formatting of the tape medium according to the format in step 300.

If in decision step 304 it is found that the unused area of the tape medium does not comprise a tape medium identifier, the method proceeds to step 300, formatting the tape medium according to the legacy format. In this way, the method enables to rely on that any tape medium bearing a tape medium identifier in the unused area has been identifiable by the same tape medium identifier throughout its entire history of past use.

Alternatively, the method can be modified to proceed to step 310 from decision step 304 if it is found that the unused area of the tape medium does not comprise a tape medium identifier, generating in step 310 a new tape medium identifier for the tape medium. In this way, the method enables to track the future use also for tape media that have not been identifiable by a tape medium identifier during a part of its past use history.

Figure 4:
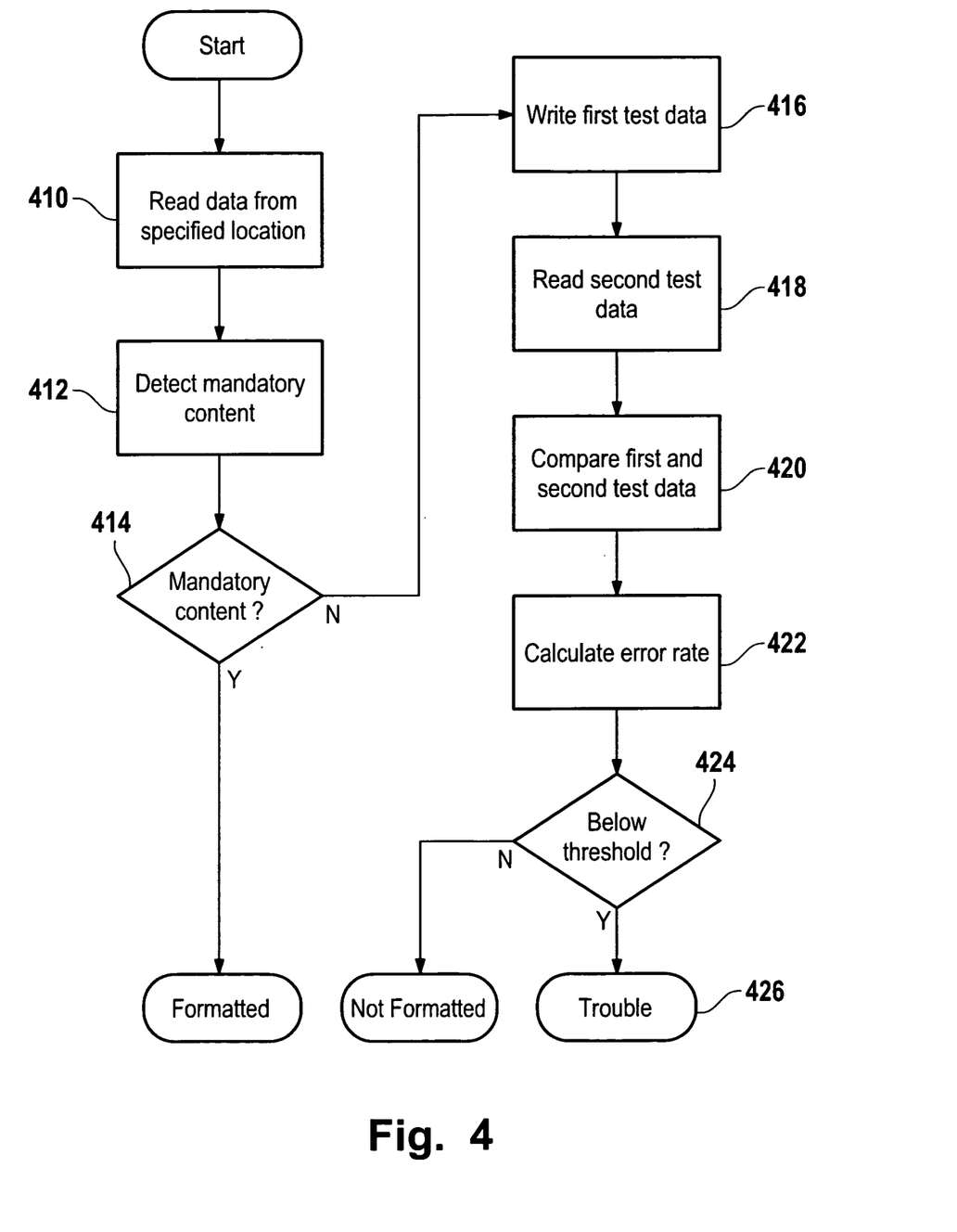
FIG. 4 is a flowchart of a determining step of an embodiment.

FIG. 4 shows a flowchart depicting in detail how a method of an embodiment of the invention determines whether the tape medium has previously been formatted. In step 410, data are read from a location of the tape medium that is specified by the format to comprise mandatory content. In step 412, the data read from the location is examined to detect whether it comprises the mandatory content. Optionally, steps 410 and 412 are integrated, in such a way that a function is called to read the mandatory content from the specified location, the function returning an indication of either success or failure. If the mandatory content is read successfully from the specified location, decision step 414 arrives at the conclusion that the tape medium is formatted.

Failure to detect the mandatory content in step 412 can be caused by the tape medium being unformatted, or by improper functioning of the first tape drive apparatus, for example by clogged tape heads preventing data from being read from the tape medium. In order to verify that the tape medium is unformatted, a test is performed in steps 416-422 to confirm that the first tape drive apparatus is functional for reading data from the tape medium.

In step 416, first test data are written to a test location of the tape medium, optionally within the unused area. In step 418, second test data are read from the same test location. In step 420, the first and second test data are compared, optionally in a bit-by-bit fashion. In step 422, an error rate is calculated, optionally by dividing the number of bits found to differ between the first and second test data by the overall number of bits written to the tape medium in step 416. If the calculated error rate remains below a predefined threshold, decision step 424 arrives at the conclusion that the first tape drive apparatus is functional for reading data from the tape medium and therefore the tape medium has been verified to be unformatted.

If the error rate exceeds the predefined threshold, decision step 424 arrives at the conclusion that the first tape drive apparatus is not functioning correctly. Optionally, the first tape drive apparatus indicates a trouble condition 426, for example by flashing an indicator light.

Figure 5:
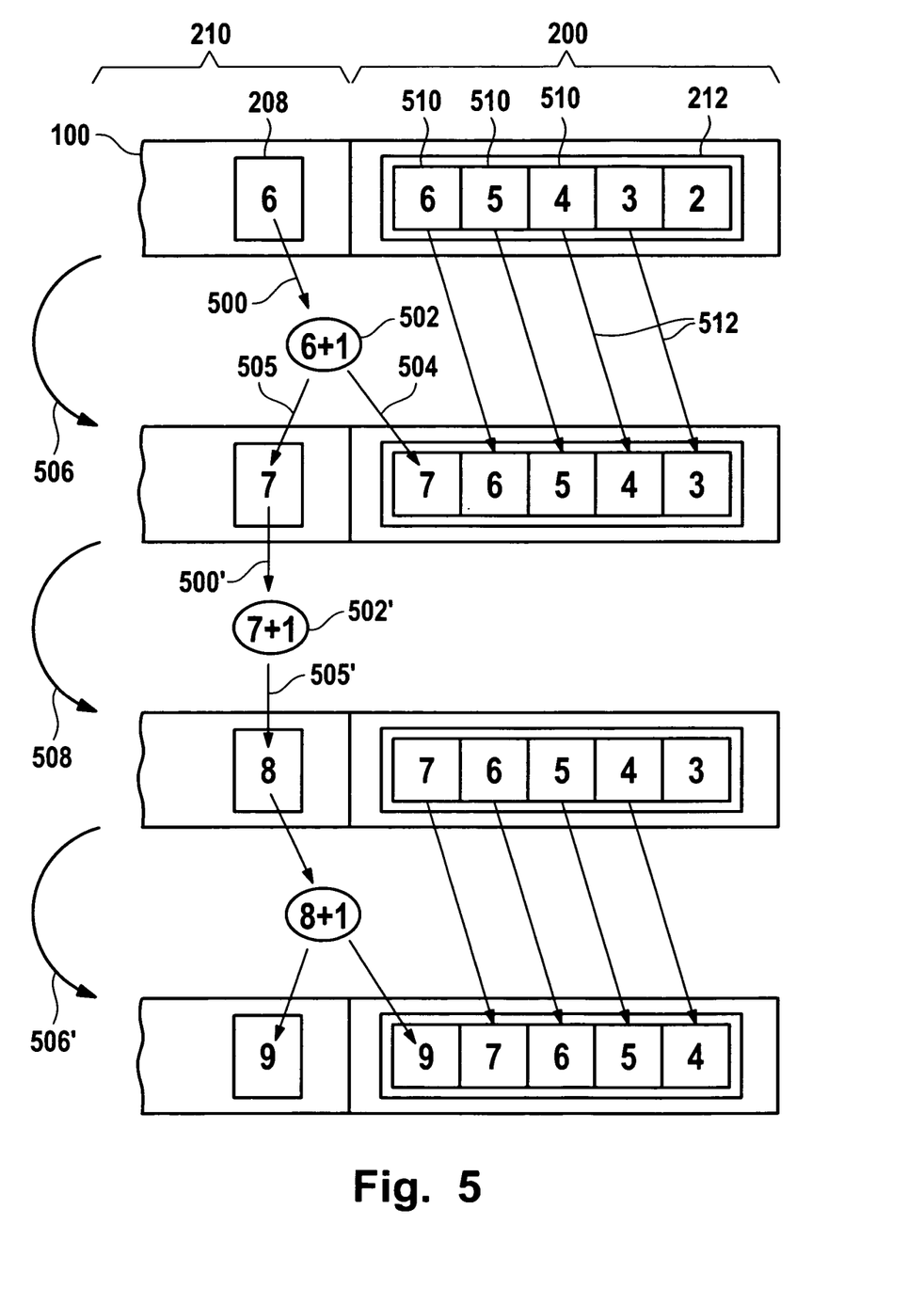
FIG. 5 is a diagram depicting the recording of an extended log of tape usage according to an embodiment.

FIG. 5 is a diagram depicting the recording of an extended log 212 of tape usage information in the unused area 200 of the tape medium 100 according to an embodiment. The same tape medium 100 is shown in four stages, demonstrating the effect of subsequently subjecting the tape medium 100 to a data recording session 506 in the first tape drive apparatus, a data recording session 508 in the second tape drive apparatus, and a further data recording session 506' in the first tape drive apparatus.

In each stage the system area 210 of tape medium 100 is shown to comprise the count 208 of recording sessions. The contents of the system area 210, including the count 208 of recording sessions, are specified by the format, and in accordance with the format specifications updated by both the first and second tape drive apparatuses. Optionally, the count 208 of recording sessions is set to zero upon the first formatting of the tape medium 100, and during each recording session in either the first or second tape apparatus incremented by one. Optionally, during re-formatting of the tape medium 100 in either the first or second tape drive apparatuses, the count 208 of recording sessions is read from the tape medium and re-used for the re-formatting operation, thus preserving the value of the count 208.

The tape medium 100 is shown in the first of the four depicted stages to comprise a value "6" for the count of recording sessions, signifying that the tape medium 100 at this stage has been subjected to six data recording sessions since it was first formatted. During data recording session 506 the first tape drive apparatus in reading operation 500 reads the value "6" of count 208 into a volatile memory, in updating operation 502 increments it by one, and in writing operation 505 writes the resulting value of "7" back to the system area 210 of the tape medium 100.

The tape medium 100 is now ejected from the first tape drive apparatus and loaded on the second tape drive apparatus for recording session 508. The second tape drive apparatus in reading operation 500' reads the value "7" of count 208 into a volatile memory, in updating operation 502' increments it by one, and in writing operation 505' writes the resulting value of "8" back to the system area 210 of the tape medium 100.

The tape medium 100 is in turn ejected from the second tape drive apparatus and loaded on the first tape drive apparatus for a further recording session 506', which results in an updated value "9" of the count 208 of recording sessions being written to the system area 210 of the tape medium 100. In the way shown, the first tape drive apparatus updates the count 208 of recording sessions analogously to the second tape drive apparatus, observing the specifications of the format.

For each stage, the unused area 200 of the tape medium 100 is shown to comprise the extended log 212 of tape usage information. Optionally, the extended log 212 comprises a plurality of log sections 510. Each of the log sections 510 contains information relating to a corresponding one of the data recording sessions that the tape medium 100 has so far been subjected to. In particular, each of the log sections 510 is shown to comprise the value that the count 208 of recording sessions was updated to during the corresponding recording session. In the first stage of the tape medium, the log sections 510 of the extended log 212 are shown as respectively relating to the $6^{th}$, $5^{th}$, $4^{th}$, $3^{rd}$, and $2^{nd}$ data recording session that the tape medium 100 was subjected to since formatting, thus constituting a cumulative record of tape usage covering the previous five recording sessions.

During data recording session 506, which according to the count 208 of recording sessions amounts to the $7^{th}$ data recording session that the tape medium 100 was subjected to since formatting, the first tape drive apparatus in copying operation 510 copies the log sections 510 respectively relating to the 6$^{th}$, 5$^{th}$, 4$^{th}$, and 3$^{rd}$ recording session to the respective positions previously occupied by the log sections 510 respectively relating to the 5$^{th}$, 4$^{th}$, 3$^{rd}$, and 2$^{nd}$ recording sessions. Then, in recording operation 504 a log section relating to the recording session 506 and comprising the updated value "7" of the count 208 is written as part of the extended log 212, overwriting the position previously occupied by the log section relating to the 6$^{th}$ recording session.

During data recording session 508 in the second tape drive apparatus, the extended log 212 in the unused area 200 is not updated. Because the second tape drive apparatus updates the count 208 of recording sessions, a mismatch arises between the count 208 of recording sessions and the value of the count in the log section 510 of the extended log 212 that relates to the last recording session in the first tape drive apparatus.

During the following data recording session 506' in the first apparatus the same copying 512 and recording 504 operations are carried out as described for the data recording session 506. There no longer is a mismatch between the count 208 of recording sessions and the value of the count in the log section 510 of the extended log 212 that relates to the last recording session in the first tape drive apparatus. However, because data recording session 508 employed the second tape drive apparatus, there is no section 510 relating to it in the extended log 212.

Optionally, the extended log 212 is used by the first tape drive apparatus, or by an external backup or utility application for analysing the history of past use of the tape medium. Because of the correspondence between the count 208 of recording sessions and the values of the count 208 stored in each log section 510 of the extended log 212, the analysing tape drive apparatus or application is enabled to identify to which of the sequence of past recording sessions each of the log sections 510 relates.

LIST OF REFERENCE NUMERALS

100 Tape medium
102 First tape drive apparatus
104 Second tape drive apparatus
106, 106' Data transfer unit
108, 108' Formatting module
110 Recording module
112 Determiner
114 First reading module
116 Second reading module
118 Detector
120 Writing module
122 Third reading module
124 Comparer
126 Calculator
128 Fourth reading module
130, 130' Counting module
132 Logger
134 Data processing unit
135, 135' Interface
136, 136' Host computer
138, 138' Processor
140, 140' Backup application
200 Unused area
202 Tape medium identifier
203 Mandatory content
204 Specified location on the tape medium
206 Test location
208 Count of data recording sessions
210 System area
212 Extended log of tape usage information
214 Data area
300 Formatting of tape medium
302 Recording of tape medium identifier
304 Determining of existence of previously recorded tape identifier
306 Reading of previously recorded tape identifier
308 Determining whether tape medium has previously been formatted
310 Generating of tape medium identifier
410 Reading from specified location
412 Detecting of presence of mandatory content
414 Determining that tape medium has previously been formatted
416 Writing of first test data
418 Reading of second test data
420 Comparing of first and second test data
422 Calculating of an error rate
424 Determining that tape medium has not previously been formatted
426 Trouble condition
500 Reading of count of recording sessions
502, 502' Updating of count of recording sessions
504 Recording of extended log
505, 505' Writing of count of recording sessions
506, 506' Data recording session in first tape drive apparatus
508 Data recording session if second tape drive apparatus
510 Log sections of extended log
512 Copying of log sections of extended log

The invention claimed is:

1. A method of storing data on a tape medium in at least one data recording session employing a tape drive apparatus operable to record the data in accordance with a format specifying an unused area of the tape medium, the method comprising:
   determining whether the tape medium has previously been formatted by writing and reading test data to a test location in the unused area of the tape medium,
   formatting the tape medium according to the format,
   determining whether the unused area of the tape medium comprises a previously recorded tape medium identifier according to the format, the determining adapted to determine that the tape medium has not previously been formatted when the tape medium does not comprise mandatory content in the specified unused area and an error rate does not exceed a predefined threshold, and
   reading the previously recorded tape medium identifier from the unused area for re-use as the tape medium identifier when it is determined that the unused area of the tape medium comprises the previously recorded tape medium identifier, and recording the previously recorded tape medium identifier as the tape medium identifier, and
   recording a new tape medium identifier in the unused area of the tape medium, when it is determined that the unused area of the tape medium does not comprise the previously recorded tape medium identifier or when the tape medium has not previously been formatted, wherein the tape medium identifier uniquely identifies the tape medium from other tape media.

2. The method of claim 1, the format further specifying the tape medium to comprise mandatory content in a specified location on the tape medium, the determining whether the tape medium has previously been formatted comprising:
   reading data from the specified location of the tape medium, detecting from the data whether the tape medium comprises the mandatory content in the specified location, and determining that the tape medium has previously been formatted when the tape medium comprises the mandatory content in the specified location.

3. The method of claim 2, the determining whether the tape medium has previously been formatted further comprising:

writing first test data to a test location of the tape medium, reading second test data from the test location of the tape medium, comparing the second test data with the first test data, calculating an error rate based on the comparison, and determining that the tape medium has not previously been formatted when the tape medium does not comprise the mandatory content in the specified location and the error rate does not exceed a predefined threshold.

4. The method of claim 1, the format further specifying a count of data recording sessions in a tape drive apparatus to be stored in a system area of the tape medium, the method further comprising:

reading the count of recording sessions from the system area of the tape medium, updating the count of recording sessions, and recording an extended log of tape usage information in the unused area of the tape medium, the extended log comprising the updated count of recording sessions.

5. The method of claim 4, wherein the recording of the extended log is performed only when the unused area comprises the tape medium identifier.

6. The method of claim 4 wherein the extended log comprises a plurality of log sections in which tape usage information is recorded relating respectively to corresponding ones of the at least one data recording sessions, the log sections together constituting a cumulative record of tape usage, each log section in respect of a recording session comprising the count of recording sessions.

7. The method of any one of claim 1 wherein the format is selected from the group consisting of DDS-3. DDS-4, and DAT 72, the unused area being a device area specified by the respective format selected.

8. A tape drive apparatus comprising:

a data transfer unit for transferring data between a tape medium and the tape drive apparatus in at least one data recording session;

a formatting module operable to control the data transfer unit to format the tape medium according to a format specifying an unused area of the tape medium, the specified unused area configured to store mandatory content;

a determiner for determining whether the unused area of the tape medium comprises a previously recorded tape medium identifier according to the format, wherein the tape medium identifier uniquely identifies the tape medium from other tape media, the determiner adapted to determine that the tape medium has not previously been formatted when the tape medium does not comprise mandatory content in the specified unused area and an error rate does not exceed a predefined threshold; and a recording module operable to control the data transfer unit to record a new tape medium identifier in the specified unused area of the tape medium when the determiner has determined that the unused area of the tape medium does not comprise the previously recorded tape medium identifier or when the tape medium has not previously been formatted, a first reading module operable to control the data transfer unit to read the previously recorded tape medium identifier from the unused area when the determiner has determined that the unused area of the tape medium comprises the previously recorded tape medium identifier, and wherein the recording module is operable to re-use the previously recorded tape medium identifier for the controlling of the data transfer unit to record the previously recorded tape medium identifier as the tape medium identifier when the determiner has determined that the unused area of the tape medium comprises the previously recorded tape medium identifier.

9. The tape drive apparatus of claim 8, the format further specifying the tape medium to comprise mandatory content in a specified location on the tape medium, the tape drive apparatus further comprising:

a second reading module operable to control the data transfer unit to read data from the specified location of the tape medium, and a detector for detecting from the data whether the tape medium comprises the mandatory content in the specified location, the determiner adapted to determine that the tape medium has previously been formatted when the tape medium comprises the mandatory content in the specified location;

the determiner adapted to determine that the tape medium has not previously been formatted when the tape medium does not comprise the mandatory content in the specified location and the error rate does not exceed a predefined threshold.

10. The tape drive apparatus of claim 9, further comprising:

a writing module operable to control the data transfer unit to write first test data to a test location of the tape medium, and a third reading module operable to control the data transfer unit to read second test data from the test location of the tape medium, a comparer for comparing the second test data with the first test data, and a calculator for calculating an error rate based on the comparison.

11. The tape drive apparatus of claim 10, the format further specifying a count of data recording sessions of the tape medium to be stored in a system area of the tape medium, the first tape apparatus further comprising:

a fourth reading module operable to control the data transfer unit to read the count of recording sessions from the system area of the tape medium, a counting module for updating the count of recording sessions, and a logger operable to control the data transfer unit to record an extended log of tape usage information in the unused area of the tape medium, the extended log comprising the updated count of recording sessions.

12. The tape drive apparatus of claim 11, the logger being adapted to control the data transfer unit to record the extended log only when the unused area comprises the tape medium identifier.

13. The tape drive apparatus of claim 11, wherein the extended log comprises a plurality of log sections in which tape usage information is recorded relating respectively to corresponding ones of the at least one data recording sessions, the log sections together constituting a cumulative record of tape usage, each log section in respect of a recording session comprising the count of recording sessions.

14. The tape drive apparatus of claim 8, the format being selected from the group consisting of DDS-3, DDS-4, and DAT 72, the unused area being a device area specified by the respective format selected.

15. A backward compatible storage apparatus for storing data on a sequential storage medium, the apparatus comprising:
- means for transferring data between the sequential storage medium and the backward compatible storage apparatus in at least one data recording session;
- means for formatting the sequential storage medium according to a legacy format specifying an unused area of the sequential storage medium, the specified unused area configured to store mandatory content;
- means for determining whether the unused area of the tape medium comprises a previously recorded tape medium identifier, wherein the tape medium identifier uniquely identifies the tape medium from other tape media, the means for determining adapted to determine that the tape medium has not previously been formatted when the tape medium does not comprise mandatory content in the specified unused area and an error rate does not exceed a predefined threshold;
- means for reading the previously recorded tape medium identifier from the unused area for re-use as the tape medium identifier when the means for determining has determined that the unused area of the tape medium comprises the previously recorded tape medium identifier;
- means for recording a new tape medium identifier of the sequential storage medium in the specified unused area of the sequential storage medium when the means for determining has determined that the unused area of the tape medium does not comprise the previously recorded tape medium identifier or when the tape medium has not previously been formatted;
- wherein the means for recording records the same previously recorded medium identifier as the tape medium identifier, when the means for determining has determined that the unused area of the tape medium comprises the previously recorded tape medium identifier; and
- means for recording an extended log of tape usage information in the unused area of the tape medium, the extended log comprising an updated count of recording sessions, wherein the extended log is recorded only when the unused area comprises the tape medium identifier.

16. The backward-compatible storage apparatus of claim 15, the legacy format further specifying a count of data recording sessions of the sequential storage medium to be stored in a system area of the sequential storage medium, the backward-compatible storage apparatus further comprising:
- means for reading the count of recording sessions from the system area of the tape medium, and
- means for updating the count of recording sessions.

* * * * *

UNITED STATES PATENT AND TRADEMARK OFFICE
CERTIFICATE OF CORRECTION

Page 1 of 1

PATENT NO. : 8,576,505 B2
APPLICATION NO. : 11/260994
DATED : November 5, 2013
INVENTOR(S) : Nigel Ronald Evans et al.

It is certified that error appears in the above-identified patent and that said Letters Patent is hereby corrected as shown below:

In the Claims:

In column 11, line 38, in Claim 7, delete "of any one of" and insert -- of --, therefor.

In column 11, line 39, in Claim 7, delete "of DDS-3." and insert -- of: DDS-3, --, therefor.

In column 13, line 2, in Claim 14, delete "of" and insert -- of: --, therefor.

Signed and Sealed this
Eleventh Day of February, 2014

Michelle K. Lee
*Deputy Director of the United States Patent and Trademark Office*